United States Patent
Greubel

(10) Patent No.: US 6,766,686 B2
(45) Date of Patent: Jul. 27, 2004

(54) DEVICE AND METHOD FOR DETECTING AXIAL PLAY

(75) Inventor: Peter Greubel, Bad Kissingen (DE)

(73) Assignee: Siemens Aktiengesellschaft, Munich (DE)

( * ) Notice: Subject to any disclaimer, the term of this patent is extended or adjusted under 35 U.S.C. 154(b) by 140 days.

(21) Appl. No.: 10/154,924

(22) Filed: May 28, 2002

(65) Prior Publication Data

US 2002/0189386 A1 Dec. 19, 2002

Related U.S. Application Data

(63) Continuation of application No. PCT/DE99/03776, filed on Nov. 26, 1999.

(51) Int. Cl.$^7$ .............................................. G01M 13/02
(52) U.S. Cl. ....................................................... 73/162
(58) Field of Search ............................ 73/162, 862.328, 73/866.1

(56) References Cited

U.S. PATENT DOCUMENTS

| | | | | |
|---|---|---|---|---|
| 4,113,324 A | * | 9/1978 | Rohr | 384/99 |
| 5,129,156 A | * | 7/1992 | Walker | 29/898.09 |
| 6,009,189 A | * | 12/1999 | Schaack | 382/154 |
| 6,058,767 A | * | 5/2000 | Calvin | 73/118.1 |
| 6,338,201 B1 | * | 1/2002 | Och | 33/501.11 |

FOREIGN PATENT DOCUMENTS

| | | |
|---|---|---|
| DE | 41 38 194 A | 5/1993 |
| DE | 196 32 139 | 7/1997 |
| EP | 0 133 527 A | 2/1985 |
| WO | WO 97 43564 A | 11/1997 |

* cited by examiner

Primary Examiner—Max Noori
(74) Attorney, Agent, or Firm—Sughrue Mion, PLLC

(57) ABSTRACT

The axial play of a gearbox shaft (3) that meshes with a gearbox output (7) is determined by measuring the translational travel of the rotationally driven gearbox shaft (3) between the axial end stops (A1; A2) thereof while simultaneously blocking the gearbox output (7). The end stops define the axial play of the gearbox shaft (3). The commutator-dependent ripple of the motor current (IM) pertaining to the commutator motor which drives the gearbox shaft (3) in a drive unit (1; 2) is evaluated as the representative variable for the translational travel.

16 Claims, 2 Drawing Sheets

DEVICE AND METHOD FOR DETECTING AXIAL PLAY

This is a Continuation of International Application PCT/DE99/03776, with an international filing date of Nov. 26, 1999, which was published under PCT Article 21(2) in German, and the disclosure of which is incorporated into this application by reference.

FIELD OF AND BACKGROUND OF THE INVENTION

The invention relates to a device and method for detecting the axial play of a gearbox shaft that meshes with a gearbox output, particularly a worm shaft of a gear motor actuator that meshes with a worm gear. Such actuators with a commutator motor and an adjoining worm gear are provided in particular for motor-driven closing systems, e.g. windows or sun roofs in motor vehicles.

Actuators of the aforementioned type, particularly in mass-produced units comprising a motor enclosure and a gear case with a continuous motor/gearbox shaft, exhibit undesirable tolerance-related axial play. This can cause end stop noises of the motor/gearbox shaft at the axial end stops on both sides as the direction of rotation is reversed.

To limit impermissible axial play, it is known, for instance, from EP 0 133 527 B2 to provide a spacer disk, which has a disk thickness that is based on a prior comparison between the actual, measured axial play and the desired axial play. This spacer disk is the contact part for at least one axial end face of the gearbox shaft, which merges into the motor shaft of a motor enclosure of a commutator motor that is flanged to the gear case receiving the gearbox shaft.

OBJECTS OF THE INVENTION

An object of the present invention is to detect, with little measurement complexity, the axial play of a gearbox shaft. It is another object to check the accuracy of an adjustment in cases where the gear parts or the motor drive parts have already been mounted in the gear case or the motor enclosure and their axial play has already been adjusted.

SUMMARY OF THE INVENTION

These and other objects are attained by a device for detecting the axial play of a gearbox shaft that meshes with a gearbox output, which device includes: means for rotationally driving the gearbox shaft between axial end stops of the gearbox shaft that limit axial play of the gearbox shaft; means for blocking the gearbox output while the gearbox shaft is driven; and means for determining a translational travel of the rotationally driven gearbox shaft between the axial end stops. The objects are also achieved by a method for detecting the axial play of a gearbox shaft that meshes with a gearbox output, the method including: rotationally driving the gearbox shaft between axial end stops of the gearbox shaft that limit the axial play of the gearbox shaft; blocking movement of the gearbox output during said rotational driving of the gearbox shaft; and determining the translational travel of the rotationally driven gearbox shaft. Advantageous embodiments of the invention are the subject of the dependent claims.

Blocking, e.g. locking, the gearbox output when the gear parts or motor parts have already been mounted and the gearbox shaft is already meshing with the gearbox output causes the motor drive to displace the gearbox shaft in a translational movement while it is secured relative to the gearbox output. As a result the actual axial play can be measured and the necessary adjustment determined, or it can be checked to ensure that the adjustment has already been made. For instance, if a spacer disk failed to be inserted due to an error or, if it was inserted, was lost again during the further assembly process, particularly during greasing, this defect can be detected.

The translational travel representing the corresponding axial play can be particularly easily determined by evaluating, in particular counting, the periodicity associated with the segment interruption of the commutator motor, i.e. the pulses of the driving commutator motor current or motor voltage characteristic, which has a corresponding ripple.

Determining the position of a part that is operationally displaced by a worm gear/commutator motor drive unit and is moved translationally or rotationally via the worm shaft and the worm gear meshing therewith by analyzing the commutation-dependent ripple of the motor current is known per se, for instance, from DE 41 38 194 A1.

BRIEF DESCRIPTION OF THE DRAWINGS

The invention as well as further advantageous embodiments of the invention set forth in the dependent claims will now be described in greater detail, by way of example, with reference to schematic embodiments depicted in the drawing in which:

DETAILED DESCRIPTION OF THE PREFERRED EMBODIMENTS

Figure 3:
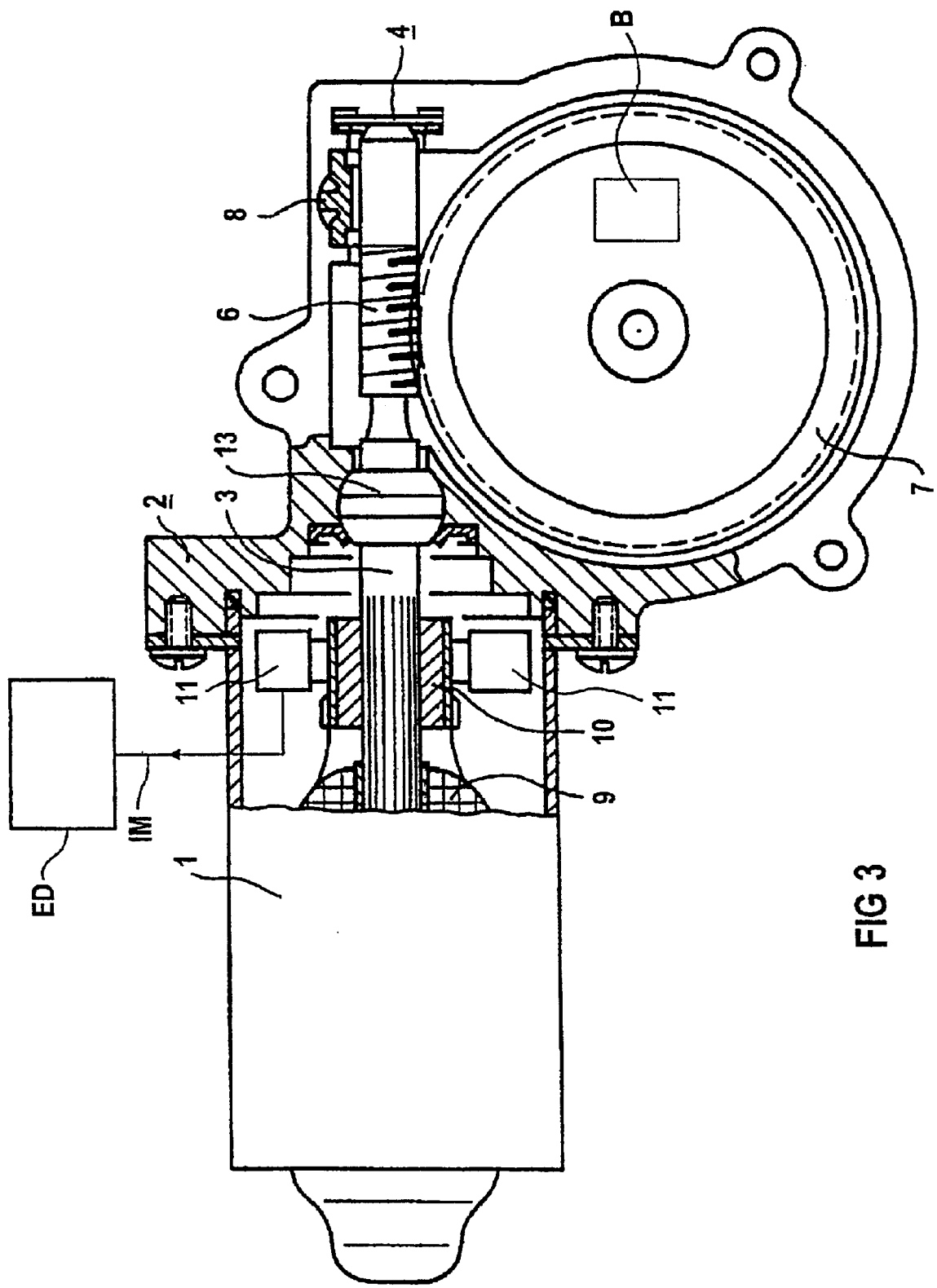
FIG. 3 shows an arrangement for adjusting the axial play of a gearbox shaft of a worm gear/commutator motor drive unit by means of a spacer disk having a disk thickness defined in each individual case on the basis of a comparison between the actual axial play and the specified axial play, with, according to the invention, a brake provided for blocking movement of the gearbox output and an evaluation device for determining the axial play.

The window lifter gear motor for a motor vehicle depicted in FIG. 3 basically includes a half-shell type gear case part 2 and a commutator motor, with a rolled cylindrical motor enclosure part 1, flanged onto the left side thereof. A gearbox shaft 3, as an extension of the rotor shaft of the commutator motor, protrudes into the half-shell type gear case part 2. On its motor-side end, this gearbox shaft 3 receives a rotor 9 and a commutator 10, which is contacted by a brush system 11. On its right free shaft end, the gearbox shaft 3 has a worm 6, which operationally meshes with a gearbox output 7 in the form of a worm gear. The worm gear in turn can be coupled to further driving means (not depicted), such as a cable sheave of a cable-operated window lifter. The right free shaft end of the gearbox shaft 3 is supported in the gear case part 2 in a cup-and-ball bearing 13. In addition, the right free shaft end is secured by a supporting bearing 8 against unallowable radial deflections arising due to the worm gear.

All the gear components can be inserted into the half-shell type gear case part 2 according to the "violin case principle." Gear case part 2 can then be finally sealed by an additional gear case part, particularly a gear case cover (not depicted). Similarly, a spacer disk 4, which is provided to limit or adjust a defined axial play, can, e.g. in a preassembly, be inserted into gear case part 2 between the axial shaft end of gearbox shaft 3 and the opposite gear case part 2.

The invention provides a particularly advantageous option to determine the axial play, or to identify the measures necessary to achieve a desired, predefined axial play—such as, in particular, a spacer disk 4 to be inserted between the shaft end of the gearbox shaft 3 and the axially opposite gear case part 2. First, the gearbox output 7, in this embodiment the cable sheave, is blocked by a brake B indicated in FIG. 3. A current, preferably a constant current is then applied to the commutator motor, such that the gearbox shaft 3 is axially moved to its one end stop, while the gear teeth of its worm 6 are simultaneously held, or roll off, along the meshing opposite gear teeth of the gearbox output 7. The current direction is then reversed and gearbox shaft 3, with gearbox output 7 still blocked, is axially moved to its other end stop.

Figure 1:
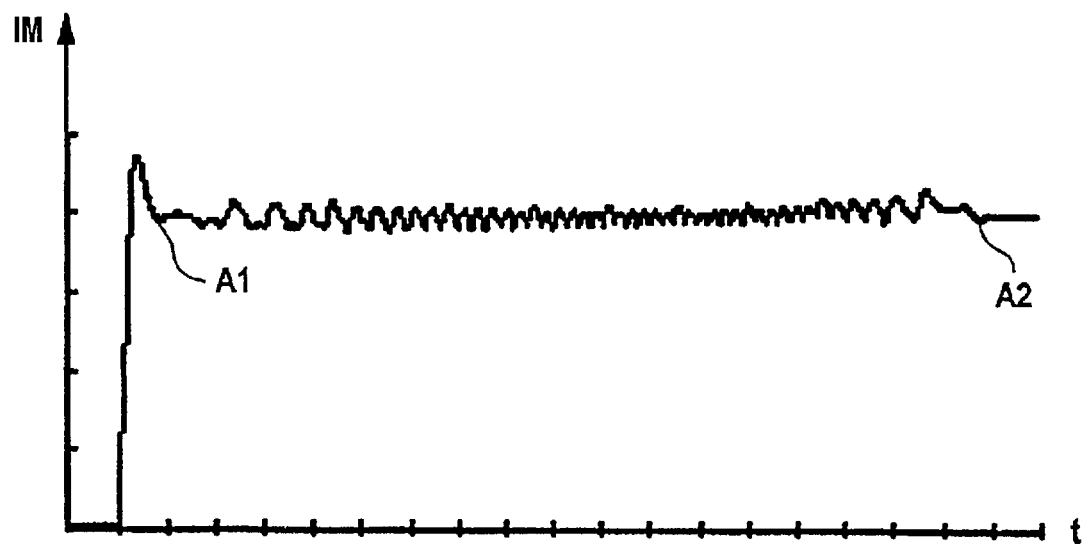
FIG. 1 shows the motor current characteristic as a function of time with a high commutator-dependent ripple pulse number corresponding to an overly large axial play between the end stops of the gearbox shaft.
Figure 2:
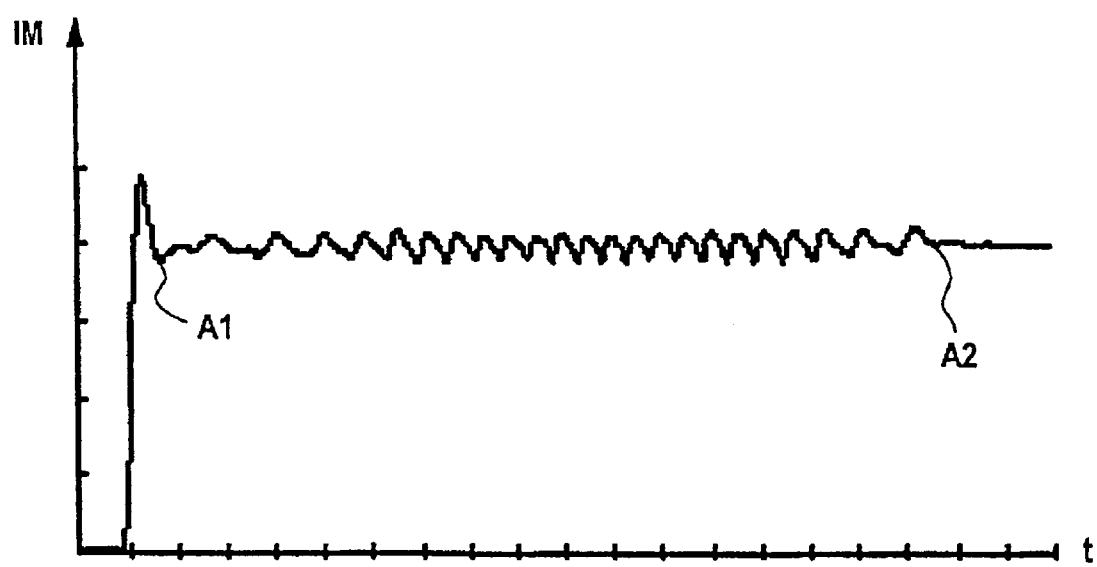
FIG. 2 shows the motor current characteristic as a function of time with a low commutator-dependent ripple pulse number corresponding to a specified axial play between the end stops of the gearbox shaft.

The dips in the time/current characteristic IM=f(t) shown in FIG. 1 and FIG. 2, which are due to the lamella junctions of the commutator, are counted in an evaluation device ED shown in FIG. 3—e.g. according to the method described in DE 41 38 194 A1, which reference is incorporated into the present application by reference. The dips are, if applicable, pulse-amplified—and are processed into a control variable representing the axial play. Counting can be effected with respect to the low signals or the high signals, as well as by using a combination thereof.

FIG. 1 shows the ripple of motor current IM between a first end stop A1, which is represented by a first lamella junction jump in the current characteristic by a low signal after a starting current pulse at the instant of the start of a rotation of gearbox shaft 3, and a second end stop A2, which is characterized by a low signal when gearbox shaft 3 subsequently comes to a stop after having traveled through the axial play path and the end of the ripple of motor current IM associated therewith.

According to one preferred embodiment of the invention, the inventive detection of the axial play is used also to monitor proper assembly of, for instance, a gear motor actuator that is provided with a spacer disk 4, known from EP 0 133 527 B2. This is accomplished by comparing, prior to final mounting of a gear case cover to seal an otherwise fully assembled unit 2; 3, the actual translational travel and a setpoint travel corresponding to a predefined axial play. This allows a determination of whether in the prior production process, particularly when gear grease was added, the pre-mounted spacer disk 4 was, e.g., inadvertently lost.

FIG. 2 shows, by way of example, a ripple profile of a test piece in which the axial play has been adjusted to be within permissible tolerances, by means of a correspondingly dimensioned spacer disk 4. FIG. 1 shows the same test piece without the spacer disk. By comparing the two diagrams it may be seen that between the two end stops A1, A2, which correspond to the start of a ripple with the beginning rotation of gearbox shaft 3 and the end of a ripple with the completed rotation of gearbox shaft 3, the different number of ripple pulses, as compared between FIG. 1 and FIG. 2, indicates a different translational travel of gearbox shaft 3 relative to the fixed gearbox output 7. In particular, this translational travel is larger if the spacer is incorrectly absent.

This counting is advantageously independent of the rotational speed of the gearbox shaft, since this speed affects only the density of the counting pulses over time. Testing is advantageously carried out at a constant current to enable a simple calculation of the travel by comparing the counting pulses according to FIG. 1 on the one hand and FIG. 2 on the other hand.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. Device for detecting the axial play of a gearbox shaft that meshes with a gearbox output, comprising:
    means for rotationally driving the gearbox shaft between axial end stops of the gearbox shaft that limit axial play of the gearbox shaft;
    means for blocking the gearbox output while the gearbox shaft is driven; and
    means for determining a translational travel of the rotationally driven gearbox shaft between the axial end stops.

2. The device as claimed in claim 1, wherein the gearbox shaft that meshes with the gearbox output is a worm shaft of a gear motor actuator that meshes with a worm gear.

3. The device as claimed in claim 1, wherein said blocking means comprises a brake.

4. The device as claimed in claim 1, wherein:
    said driving means comprises a commutator motor with lamella that rotationally drives the gearbox shaft; and
    said determining means comprises an evaluation device that analyzes commutation-dependent ripple of at least one of the motor current or the motor voltage associated with the lamella of the commutator motor.

5. The device as claimed in claim 4, wherein said evaluation device analyzes the commutation-dependent ripple by counting a pulse number of at least one of the motor current and the motor voltage corresponding to the lamella junctions of the commutator motor.

6. The device as claimed in claim 1, further comprising:
    an electric motor drive that drives the gearbox shaft to its one axial end stop; and
    an electric motor drive that drives the gearbox shaft to its other axial end stop;
    wherein said determining means analyzes ripple of at least one of the motor current and the motor voltage between the two end stops.

7. The device as claimed in claim 6, wherein said electric motor drive that drives the gearbox shaft to the other axial end stop comprises a constant current drive.

8. The device as claimed in claim 6, wherein said electric motor drive that drives the gearbox shaft to the other axial end stop is the same electric motor drive that drives the gearbox shaft to the one axial end stop.

9. The device as claimed in claim 1, wherein:
    said determining means compares the translational travel of the gearbox shaft with a predetermined setpoint travel that defines a desired axial play and thereby provides information for determining correct assembly of at least one spacer disk configured to be interposed between an end of the gearbox shaft and an associated opposite end stop.

10. A method for detecting the axial play of a gearbox shaft that meshes with a gearbox output, comprising:

rotationally driving the gearbox shaft between axial end stops of the gearbox shaft that limit the axial play of the gearbox shaft;

blocking movement of the gearbox output during said rotational driving of the gearbox shaft; and determining the translational travel of the rotationally driven gearbox shaft.

11. The method as claimed in claim 10, wherein the gearbox shaft that meshes with the gearbox output is a worm shaft of a gear motor actuator that meshes with a worm gear.

12. The method as claimed in claim 10, wherein:

said driving comprises driving the gearbox shaft with a commutator motor; and said determining comprises analyzing commutation-resultant ripple, arising due to the lamella of the commutator motor, of at least one of the motor current or the motor voltage in an evaluation unit.

13. The method as claimed in claim 12, wherein said analyzing of the commutation-resultant ripple comprises counting a pulse number of at least one of the motor current and the motor voltage corresponding to the lamella junctions of the commutator motor.

14. The method as claimed in claim 10, wherein:

said driving comprises driving the gearbox shaft with an electric motor drive up to a first axial end stop of the gearbox shaft and driving the gearbox shaft with an electric motor drive up to a second axial end stop of the gearbox shaft; and said determining comprises analyzing ripple of at least one of the motor current or the motor voltage between the two axial end stops.

15. The method as claimed in claim 14, wherein the electric motor drive driving the gearbox shaft up to the second axial end stop comprises a constant-current drive.

16. The method as claimed in claim 10, wherein said determining comprises determining an actual translational travel of the rotationally driven gearbox shaft; and further comprising:

adjusting the axial play by interposing at least one spacer disk between a gearbox shaft end and an associated opposite end stop;

comparing the actual translational travel with a setpoint travel that is determined in advance as a predefined axial play compensation; and identifying correctness of assembly of the spacer disk from said comparing.

* * * * *